L. B. FIELDS.
BALING PRESS.
APPLICATION FILED AUG. 2, 1909.
948,759.
Patented Feb. 8, 1910.
2 SHEETS—SHEET 1.
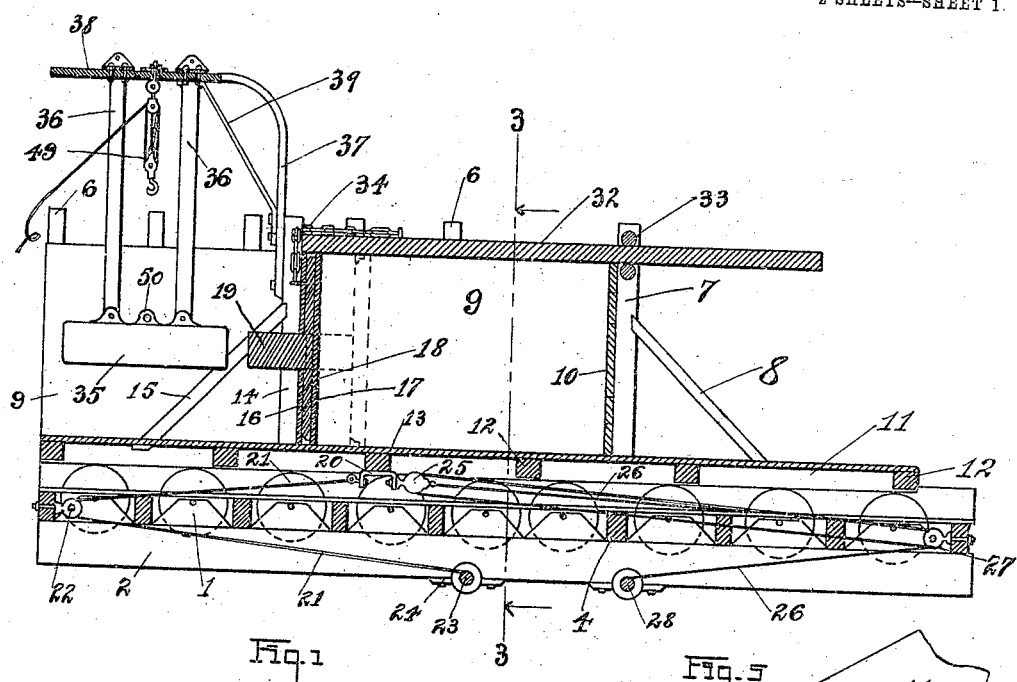
Witnesses:
Brennan B. West.
Chas. O. Watt
Inventor
Laurence B. Fields,
By Banks, Fouts & Shell,
Attys.

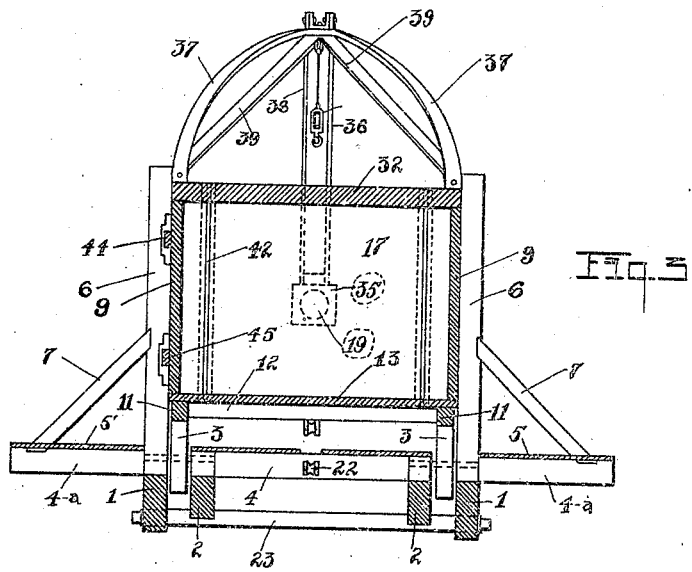
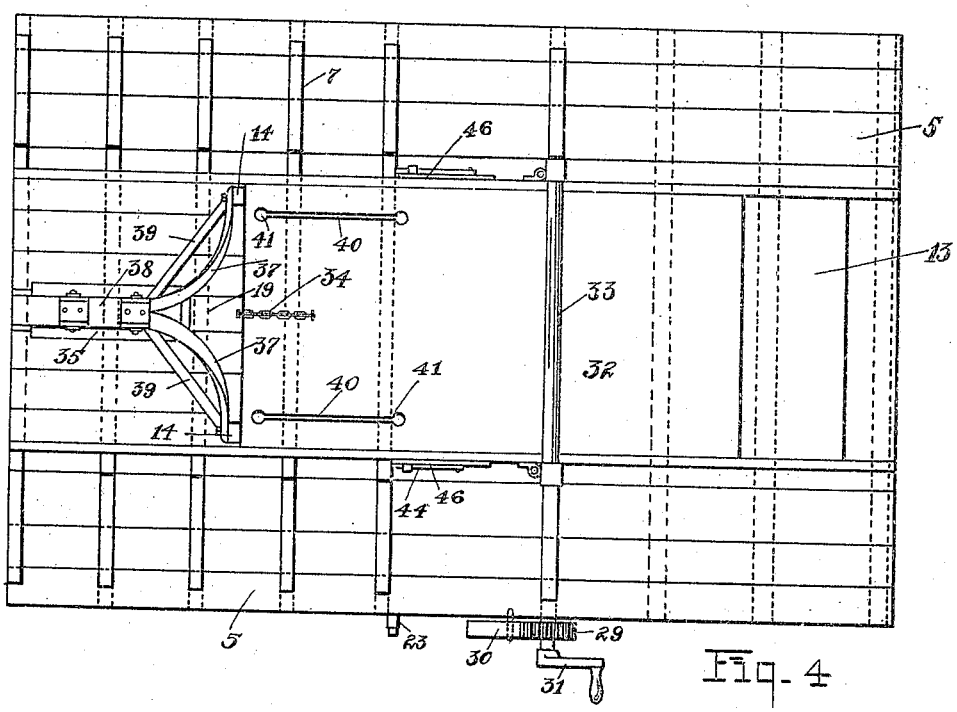

UNITED STATES PATENT OFFICE.

LAWRENCE B. FIELDS, OF JEFFERSONVILLE, INDIANA.

BALING-PRESS.

948,759.

Specification of Letters Patent. Patented Feb. 8, 1910.

Application filed August 2, 1909. Serial No. 510,734.

*To all whom it may concern:*

Be it known that I, LAWRENCE B. FIELDS, a citizen of the United States, residing at Jeffersonville, in the county of Clark and State of Indiana, have invented a certain new and useful Improvement in Baling-Presses, of which the following is a full, clear, and exact description, reference being had to the accompanying drawings.

This invention relates to presses for baling hay, straw, cotton or similar material; and it has for its object the production of a press for that purpose which is simple and economical in construction, which requires comparatively little power for operation, which is portable,—the same being carried upon a wagon the same as a hay rack,—and which is arranged for the convenient tying of the bale in the press. These and other objects of the invention will be more fully set forth in the following description of the accompanying drawings, in which—

Figure 1 is a central longitudinal section through the press; Fig. 2 is a side elevation of the press looking in the same direction as in Fig. 1; Fig. 3 is a transverse section on the line 3—3 of Fig. 1; Fig. 4 is a plan view of the press; Fig. 5 is a fragmentary perspective view showing a portion of the lid or cover for the compressing box, with the slots therein through which the wire or cord may be passed for tying the bale, and Fig. 6 is a similar view showing a portion of an end wall of the compressing box with the grooves therein through which the wire or cord may be passed.

Heretofore, as far as I am aware, it has been necessary to exert a continuously increasing pressure upon the material to be baled, such operating requiring a great deal of power and consequent strength and massiveness of construction. In my press, the initial pressure upon the bale is obtained by means which exert such a continuously increasing pressure, but the final compressing operation is effected by a hammer which delivers blows upon the presser head, the space gained by such blows being taken up and maintained by the pressing means first referred to.

Referring to the drawings for a more complete disclosure of the invention, 1 represents the main longitudinal sills of the press, the same being spaced apart a distance substantially equal to the space between the standards on the bolsters of farm wagons so that the entire press may be placed upon the wagon and hauled about the field. Extending parallel to the sills 1 and spaced therefrom are longitudinal members 2, the sill and corresponding member on each side of the press forming journaled supports for rollers or wheels 3. The sills, the members 2, and cross members 4 form part of the main frame of the press. The cross members preferably extend for some distance beyond the sills, as shown at 4ª, and floors 5 are laid thereon so as to form projecting platforms upon which the finished bales may be placed for transportation.

Extending upwardly from the sills 1 of the press on each side of the latter are uprights 6, the same being held against outward movement by braces 7 that extend from the ends 4ª of the cross members 4 of the main frame. The end upright 7 at the front of the machine is also held against forward movement by braces 8 which connect said uprights with the sills of the main frame. Dressed planking line the space formed by the said uprights, the side planking being shown at 9 and the planking at the front end being shown at 10, the latter planking being secured to the end uprights 7. The sides and front end of the press are therefore made stationary with respect to the main frame.

Resting upon the rollers or wheels 3 are the longitudinal members 11 of the movable frame of the press, said members being joined by cross pieces 12. The upper surface of this movable frame is floored, as shown at 13, said frame being adapted to move back and forth upon the rollers 3, the floor planking 13 of the frame passing beneath the end planking 10 of the compressing box. Rising from the movable frame toward its rear end are uprights 14, the same being suitably held against rearward movement by braces 15. The forward faces of the uprights 14 are covered by a double layer of planking 16 and 17, between which layers I confine a metallic plate 18, said plate having a rearwardly extending hammer pin 19, for a purpose hereinafter described. The uprights 14 and the planking carried thereby form what I term the "presser head."

Secured to the under side of one of the cross members 12 of the movable frame, is a plate 20 having downwardly extending eye-pieces, as shown in Fig. 1. To said plate, I attach one end of a retracting rope or cable 21, said cable passing rearwardly over a sheave or pulley 22 and thence forwardly to a winding shaft or drum 23 to which the rope or cable is attached. This shaft is suitably mounted in journals 24 on the lower sides of the sills 1, and the ends of the same are squared to receive a crank by means of which the same may be rotated as a windlass to wind up the rope or cable and draw the movable frame rearwardly. Also attached to the plate 20 is a pulley-block 25, to which is secured one end of a rope or cable 26, the same passing forwardly over a sheave or pulley 27 at the front end of the press, thence rearwardly over the pulley in the block and thence back over a pulley at the front of the press and thence to a winding shaft or drum 28 that is also journaled in the main frame parallel to the shaft or drum 23. The shaft 28 has secured thereto a ratchet wheel 29 with which engages a weighted detent pawl 30. This shaft or drum has a crank 31 by means of which it may be turned as a windlass to wind up the rope or cable 26 and thus draw the movable frame of the press forwardly.

The top of the compressing box is closed by a lid 32, the forward end of which extends between cross bars or rollers 33 which are supported in the upper ends of the upright members 7. The rear end of the lid is secured to the pressing head by any suitable means, as by a chain 34 which is fastened at one of its ends to the lid and has its other end removably attached to the presser head. The chain may be thus attached in any desired manner, as by a pin carried by the head over which the chain may be hooked.

The hay or other material to be compressed is placed within the compressing box formed by the front wall 10, the side walls 9, the rear wall 17 of the pressing head, and the floor 13, and is tamped therein, after which the lid 32 is pressed into place and secured. The windlass shaft or drum 28 is then rotated, thereby drawing the movable frame forwardly as far as possible and pressing the material between the head and the rear wall 10 of the compressing box. While the material may be compressed to a considerable extent by the windlass means just described, I desire to compress the same still further; and, for this purpose, I mount on the movable frame of the press, and preferably on the presser head, as shown, a hammer 35 by means of which successive blows may be delivered to the hammer pin 19, such blows driving the head forwardly, the space thus gained by each blow being taken up and maintained by turning the shaft or drum 28 and winding up the cable 26, the weighted pawl 30 and the ratchet wheel 29 preventing the reverse rotation of the shaft or drum. The hammer 35 is suspended by links 36 from arms 37 that are attached to the uprights 14 of the presser head, said arms extending upwardly and inwardly to the center line of the press where they are joined, said arms then extending rearwardly, as shown at 38, the links being attached at their upper ends to the rearwardly extending portions of said arms. For strengthening the arms, braces 39 are extended from the vertical to the horizontal portions, as shown.

After the material has been pressed to the desired size, the same must be suitably bound or tied before the pressure on the material is relaxed; and, for this purpose, I form in the lid 32 forwardly and rearwardly extending slots 40, the ends of which are enlarged, as shown at 41. Registering with the slots 40 are dove-tailed grooves 42 that are formed on the inner faces of the presser head and of the front wall 10. Slots similar to the slots 40 are also formed in the floor 13 of the movable frame. The wires or cords for tying the bale are passed about the latter through the said slots and grooves, and the ends of the same are secured together. When thus secured, the operator places the crank 31 on the squared end of the shaft 23 and draws the movable frame backwardly to relax the pressure on the bale.

In order to remove the bale from the press, I form in one or both of the sidewalls 9, a door 43, the same being hinged at its front edge to the uprights 7, and having its rear edge held in place by a pair of bolts 44 and 45, said bolts being mounted for longitudinal movement on the door in such a manner that their rear ends may be thrust into apertures or keepers in the adjacent upright 6. I prefer to operate these two bolts together from the same means; and, for this purpose, I pivot a lever 46 to the door at the point 47 the bolt 44 being pivoted to said lever above the pivot of the latter. The bolt 45 is pivoted to the lower end of a lever 48, said lever being pivoted at its center to the door at a point substantially below the point 47. The lower end of the lever 46 and the upper end of the lever 48 are pivoted together by a loose joint connection whereby the movement of the hand lever 46 results in swinging the lever 48, and in thus operating simultaneously and to the same extent the bolts 44 and 45.

Owing to the manner in which the hammer 35 is suspended, the same is liable to swing about while the press is being transported; and, as the hammer is of considerable weight, there is some liability of injury being done by the hammer in this way. For this reason, I prefer to remove the hammer from the links 36 and either place it upon the floor of the press or dump the same in the field where it can be picked up later. I therefore attach to the arms 37 a block-and-tackle, as shown at 49, the same having a hook which is adapted to engage in an eyepiece 50 in the hammer. By this means, the hammer may be lifted and disconnected from the links 36, if desired.

While I have thus shown and described a satisfactory embodiment of my invention, the details thereof may be varied, and I desire to have it understood that the following claims are not intended to be limited to such details any further than is rendered necessary by the specific terms employed, or by the prior state of the art.

Having thus described my invention, what I claim is:

1. In a baling press, the combination with stationary walls, of a presser head movable between said walls, means for delivering blows upon the presser head for compressing the material, and means connected with the presser head for holding the latter against return movement after a blow is delivered.

2. In a baling press, the combination with stationary side walls, and a stationary end wall, of a movable presser head movable between said walls, means for delivering blows upon the presser head for compressing the material, and means connected with the presser head for holding the latter against return movement after a blow is delivered.

3. In a baling press, the combination with a stationary frame, of stationary walls supported upon said frame, a movable frame mounted upon the stationary frame, a presser head upon said movable frame, said head extending between certain of the stationary walls, windlass mechanism for drawing the presser head in a direction for compressing the material in the press, means for delivering blows upon the presser head for driving the latter in the same direction, and means for holding the presser head against reverse movement.

4. In a baling press, the combination with a stationary frame, of stationary side walls and a stationary end wall supported upon said frame, a movable frame mounted upon the stationary frame, a presser head upon said movable frame, said head extending between the side walls of the press, windlass mechanism for drawing the presser head in a direction for compressing the material in the press, means for delivering blows upon the presser head for driving the latter in the same direction, and means on the windlass mechanism for holding the presser head against reverse movement.

5. In a baling press, the combination with a main frame, of rollers journaled in said frame, a movable frame resting upon said rollers, stationary side walls and a stationary end wall upon the main frame, a bottom and a top wall for the press carried by the movable frame, a presser head also carried by the movable frame, windlass mechanism for drawing the presser head toward the stationary wall of the press, means for delivering blows upon the presser head for driving the latter toward the stationary end of the press, and means for holding the presser head against reverse movement.

6. In a baling press, the combination with a main frame, of rollers journaled in said frame, a movable frame resting upon said rollers, stationary side walls and a stationary end wall upon the main frame, a bottom and a top wall for the press carried by the movable frame, a presser head also carried by the movable frame, windlass mechanism for drawing the presser head toward the stationary wall of the press, means carried by the presser head for delivering blows upon the said head for driving the latter toward the stationary end of the press, and means connected with the windlass mechanism for holding the presser head against reverse movement.

7. In a baling press, the combination with a main frame, of a movable frame supported upon the main frame, stationary side walls, and a stationary end wall for the press upon the main frame, a floor and a lid for the press carried by the movable frame, a presser head also carried by the movable frame and movable between the side walls of the press, windlass mechanism connected with the movable frame for moving the latter in a direction to compress the material between the presser head and the stationary end wall, an arm connected with the presser head, a hammer suspended from said arm in a position for delivering blows to the presser head, and means for preventing reverse movement of the presser head after a blow is delivered thereto.

8. In a baling press, the combination with a main frame, of a plurality of rollers, a movable frame resting upon said rollers, stationary side walls, and a stationary end wall for the press upon the main frame, a floor and a lid for the press carried by the movable frame, a presser head also carried by the movable frame and movable between the side walls of the press, windlass mechanism connected with the movable frame for moving the latter in a direction to compress the material between the presser head and the stationary end wall, an arm connected with the presser head, a hammer suspended from said arm in a position for delivering blows to the presser head, and means connected with the windlass mechanism for preventing reverse movement of the presser head after a blow is delivered thereto.

9. In a baling press, the combination with a main frame having longitudinal sills, longitudinal members parallel with said sills, rollers journaled in said sills and members, stationary side walls and a stationary end wall for the press mounted upon the main frame, a movable frame resting upon the said rollers, a bottom wall and a lid for the press carried by the movable frame, and movable with respect to the stationary side and end walls, a presser head carried upon the movable frame and movable between the side walls of the press, a plunger pin extending rearwardly from the presser head, and a weight suspended in position for delivering blows to the plunger pin, whereby the plunger head is driven toward the stationary end wall, and the material in the press is compressed into a bale.

10. In a baling press, the combination with a main frame having longitudinal sills, longitudinal members parallel with said sills, rollers journaled in said sills and members, stationary side walls and a stationary end wall for the press mounted upon the main frame, a movable frame resting upon the said rollers, a bottom wall and a lid for the press carried by the movable frame and movable with respect to the stationary side and end walls, a presser head carried upon the movable frame and movable between the side walls of the press, a plunger pin extending rearwardly from the presser head, and a weight suspended in position for delivering blows to the plunger pin, whereby the plunger head is driven toward the stationary end wall, and the material in the press is compressed into a bale, and means for preventing reverse movement of the presser head after a blow is delivered.

11. In a baling press, the combination with longitudinal sills and with longitudinal members parallel thereto, of rollers journaled in said sills and members, cross ties connecting the said sills and members and extending beyond the latter, a floor covering the extending ends of said ties, upright members rising from the said sills, braces connecting the said upright members with the extended ends of the ties, side walls connected with the inner sides of the said members, a front wall for the press connected with the rear sides of the end upright members, a movable frame resting upon the said rollers, a bottom for the press on said movable frame, a removable lid carried by the movable frame for closing the upper side of the press, a plunger head for closing the rear end of the press, windlass mechanism for drawing the movable frame toward the stationary end of the press, and a hammer carried by the press for striking the presser head and driving the same toward the front wall of the press for forming the bale.

12. In a baling press, the combination with longitudinal sills and with longitudinal members parallel thereto, of rollers journaled in said sills and members, cross ties connecting the said sills and members and extending beyond the latter, a floor covering the extending ends of said ties, upright members rising from the said sills, braces connecting the said upright members with the extended ends of the ties, side walls connected with the inner sides of the said members, a front wall for the press connected with the rear sides of the end upright members, a movable frame resting upon the said rollers, a bottom for the press on said movable frame, a removable lid carried by the movable frame for closing the upper side of the press, a plunger head for closing the rear end of the press, windlass mechanism for drawing the movable frame toward the stationary end of the press, and a hammer carried by the movable frame for striking the presser head and driving the same toward the front wall of the press for forming the bale, and means connected with the windlass mechanism for preventing reverse movement of the presser head after a stroke of the hammer.

13. In a baling press, the combination with walls forming the compressing box of the press, of a presser head movable in said box for compressing material therein, and a hammer for delivering blows to the presser head, for the purpose specified.

14. In a baling press, the combination with walls forming the pressing box of the press, of a presser head movable in said box for compressing material therein, a hammer mounted in the press for delivering blows to the presser head, for forming the bale, and means for retaining the presser head in the positions to which it is driven by the said hammer.

15. In a baling press, the combination, with walls forming the compression box in which the material is to be compressed, of a presser head movable within said box, a hammer suspended from the presser head and adapted to be swung back and forth to deliver successive blows upon said head whereby the material is compressed in the box, and means for holding the presser head against reverse movement between successive blows of the hammer.

16. In a baling press, the combination with walls forming an open sided compression box, of a presser head closing the open side of said box, said head adapted to move in the box for compressing the material therein and being provided with a hammer pin, arms projecting from the presser head, a weight suspended from said arms and adapted to deliver successive blows to the hammer pin, and means for holding the presser head against reverse movement between successive blows of the hammer.

17. In a baling press, the combination with walls forming an open sided compression box, of a presser head closing the open side of said box, said head adapted to move in the box for compressing the material therein, a hammer pin projecting from said head, arms projecting from the presser head, a weight suspended from said arms and adapted to deliver successive blows to the hammer pin, and means for holding the presser head against reverse movement between successive blows of the hammer.

18. In a baling press, the combination with a main frame, of a stationary end wall and stationary side walls on the said frame, a movable frame supported upon the main frame, a presser head carried by the movable frame between the side walls of the main frame, a hammer suspended from the presser head and adapted to deliver blows upon the latter for driving the head toward the stationary end wall, whereby the material contained within said walls is compressed, a door in one of the said side walls, a pair of latching bolts for holding the said door in closed position, and a hand lever for simultaneously retracting said bolts for unlatching the door, whereby the same may be opened and the bale removed from the press.

19. In a baling press, the combination with stationary side walls and a stationary end wall, of a movable top and bottom wall, a movable end wall forming the presser head, the top and bottom walls being provided with slots and the end walls being provided with grooves alining with the said slots, and a hammer mounted in the press for delivering blows upon the end wall forming the presser head whereby the material within the press is compressed into a bale, the said slots and grooves providing spaces through which the cord or wire for tying the bale may be passed.

20. In a baling press, the combination with a main stationary frame having rollers journaled therein, of an end wall and side walls mounted stationarily on said frame, a movable frame resting upon said rollers, said frame having a floor forming the bottom of the press, a presser head carried by the movable frame above said floor, said head fitting between the side walls, a lid removably secured above the presser head and the end wall, a windlass mechanism for drawing the movable frame with the presser head and the lid rearwardly away from the stationary end wall, a second windlass mechanism for drawing the said frame in the opposite direction, a hammer carried by the press for delivering blows upon the presser head, whereby the latter is driven toward the stationary end wall, and means for holding the latter windlass mechanism against reverse movement.

21. In a baling press, the combination with a main frame comprising main sills and cross ties connecting said sills and holding the latter spaced apart a distance substantially equal to the distance between the standards of a farm wagon, whereby the press may be carried upon such a wagon, the cross ties projecting beyond the sills, floors laid upon the projecting ends of the cross ties, a stationary end wall and stationary side walls for the press rigidly connected with said main frame, rollers journaled in said main frame, a movable frame resting upon said rollers, said frame having a floor which forms the bottom of the press, a presser head carried by the movable frame above the said floor and between the side walls of the press, a lid for the press removably connected to the presser head, arms projecting upwardly from the presser head, said arms being bent laterally into a substantially horizontal position, a hammer suspended from the said horizontal portion of the arms and hanging in a position for delivering blows to the presser head, whereby the presser head may be driven forwardly toward the stationary end wall for compressing the material to be baled, and a block and tackle attached to the said horizontal portions of the arms for lifting the hammer, whereby the latter may be disconnected from the press.

In testimony whereof, I hereunto affix my signature in the presence of two witnesses.

LAWRENCE B. FIELDS.

Witnesses:
FRANCES LOUISE KERRIGAN,
GEORGE C. KOPP.